Nov. 1, 1955  T. LONGBOTHAM  2,722,428
WHEELED MACHINE BASE ADJUSTABLE TO PROVIDE
A STABLE FOUR POINT SUPPORT
Filed Oct. 24, 1951
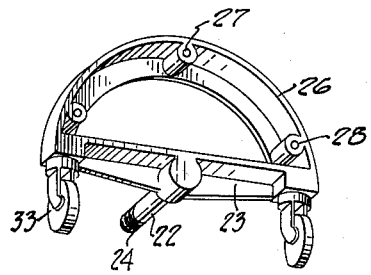
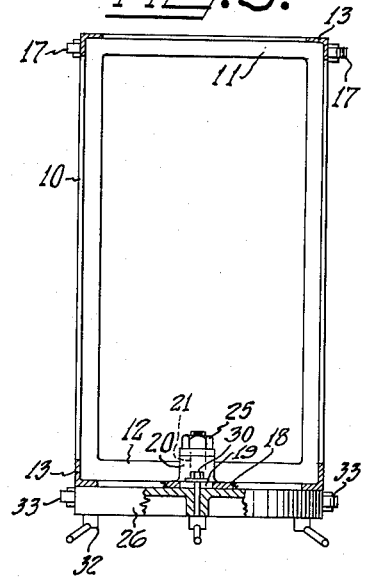
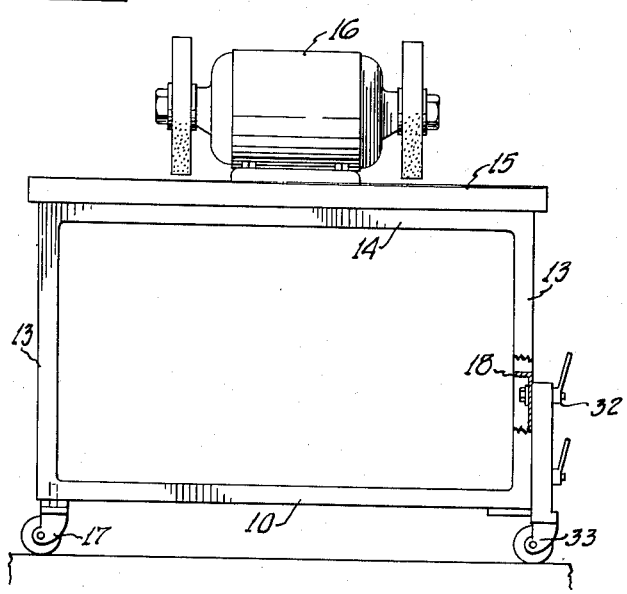
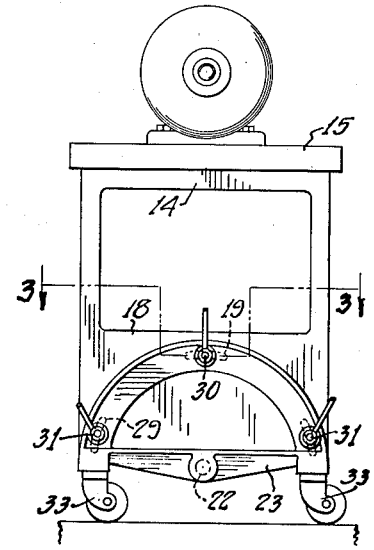
INVENTOR
THOMAS LONGBOTHAM
ATTORNEY

United States Patent Office 2,722,428
Patented Nov. 1, 1955

2,722,428
WHEELED MACHINE BASE ADJUSTABLE TO PROVIDE A STABLE FOUR POINT SUPPORT

Thomas Longbotham, Portland, Oreg.

Application October 24, 1951, Serial No. 252,921

1 Claim. (Cl. 280—6)

This invention relates generally to supports for machinery of all kinds or any object of great weight, which must rest on an uneven or sloping floor.

The main object of this invention is to provide a mounting for machinery and other objects, which will uniformly support the object under all four corners thereof.

The second object is to provide a support which is self-adjusting and which can be locked rigidly in position when once in location.

The third object is to provide a three-point temporary suspension or a four-point permanent support with an intermediate lock therefor.

I accomplish these and other objects in the manner set forth in the following specifications as illustrated by the accompanying drawing, in which Fig. 1 is a side elevation of the support.
Fig. 2 is an end elevation of Fig. 1.
Fig. 3 is a plan view of Fig. 2 with the motor removed.
Fig. 4 is a perspective view of the levelling and locking unit.

Like numbers of reference refer to the same or similar parts throughout the several views.

Referring in detail to the drawing there is shown a rectangular base 10 having transverse ties 11 and 12. From the corners of the base 10 rise the uprights 13 whose upper ends are united by the rectangular flange 14 upon which rests the table top 15 upon which may be mounted the motor 16 or any other piece of equipment or object.

One end of the base 10 is supported by a pair of casters 17 which are close to the outer corner of the base. Across the other end of the base 10 is rigidly secured the angle bar 18 having a slotted hole 19 formed therethrough. The tie 12 has a boss 20 formed at the middle thereof, through which is formed a hole 21 in which can rock the pivot 22 of the locking and levelling unit shown in Fig. 4. This unit consists of an angular bar 23 in which the pin 22 is mounted while its opposite end 24 is threaded to receive the nut 25.

On the bar 23 is the semi-circular locking bar 26 provided with the central hole 27 and the lateral holes 28 which register with the lateral slots 29 in the bar 18.

Clamping screws 30 and 31 extend from the holes 27 and 28 and through the slots 19 and 29 into the nuts 32. Under each end of the bar 23 is a caster 33.

The operation of the support is as follows: When a machine 16 is to be moved or set up on a floor which is sloping or uneven, it is moved on the casters 17 and 33 with the clamping screws 30 and 31 released. Under this condition the mounting has a three-point support on the truck but a four-point support on the floor. It can be seen that the bar 23 can rock on the pin 22. Once the mounting is in the desired position, the screws 30 and 31 are tightened and the entire unit 16 is now mounted solely on a four-point support. The advantage of this mounting is most apparent with machines having long beds, such as lathes where distortion is especially undesirable.

I claim:

A mounting for machinery having in combination a rectangular base having an elevated machine support rigidly mounted thereon, a pair of ground-engaging wheels supporting one end of the base, a transverse bar having a horizontal pivot centrally of the bar on the opposite end of said base, the axis of said pivot lying in the central vertical longitudinally extending plane of the base, a ground-engaging caster at each end of said bar, a semicircular locking member secured at its ends to said transverse bar and extending thereabove and in the vertical plane of said last named bar, said base including an integral end member disposed in a vertical plane adjacent said locking member, arcuate slots in one of said members concentric with said pivot, and clamping bolts in the other member extending through said slots for securing said locking member and transverse bar rigidly in adjusted relation to said base when said wheels are resting on an uneven supporting surface.

References Cited in the file of this patent

UNITED STATES PATENTS

| | | |
|---|---|---|
| 1,278,650 | Hewitt | Sept. 10, 1918 |
| 1,830,748 | Brown | Nov. 10, 1931 |
| 2,095,948 | Almquist et al. | Oct. 12, 1937 |
| 2,173,068 | Schroeder | Sept. 12, 1939 |